US012454847B2

(12) United States Patent
Brown et al.

(10) Patent No.: US 12,454,847 B2
(45) **Date of Patent: *Oct. 28, 2025**

(54) ELECTRONIC DOOR WITH KEY-IN-LEVER FEATURE

(71) Applicant: Schlage Lock Company LLC, Carmel, IN (US)

(72) Inventors: James W. Brown, Westfield, IN (US); James W. Overbey, Indianapolis, IN (US); Alfred S. Levesque, Newington, CT (US)

(73) Assignee: Schlage Lock Company LLC, Carmel, IN (US)

( * ) Notice: Subject to any disclaimer, the term of this patent is extended or adjusted under 35 U.S.C. 154(b) by 210 days.

This patent is subject to a terminal disclaimer.

(21) Appl. No.: 18/239,484

(22) Filed: Aug. 29, 2023

(65) Prior Publication Data

US 2024/0247518 A1 Jul. 25, 2024

Related U.S. Application Data

(60) Division of application No. 17/069,452, filed on Oct. 13, 2020, now Pat. No. 11,739,561, which is a (Continued)

(51) Int. Cl.

*E05B 47/00* (2006.01)
*E05B 17/20* (2006.01)
(Continued)

(52) U.S. Cl.

CPC .......... *E05B 47/00* (2013.01); *E05B 17/2084* (2013.01); *E05B 47/0676* (2013.01); (Continued)

(58) Field of Classification Search

CPC .. E05B 47/00; E05B 17/2084; E05B 47/0676; E05B 63/0056; G07C 9/00896; (Continued)

(56) References Cited

U.S. PATENT DOCUMENTS 3,156,495 A 11/1964 Holden
4,589,691 A 5/1986 Foshee et al.
(Continued)

*Primary Examiner* — Suzanne L Barrett

(74) *Attorney, Agent, or Firm* — Taft Stettinius & Hollister LLP

(57) ABSTRACT

An electronic door lock is operable to control access to an access controlled area adjacent the inner side of a door. The door lock includes an outer base, an inner base, a locking mechanism movable between a locked and unlocked position in response to a control signal, and a control circuit disposed within the inner base and operable to generate the control signal in response to the presentation of an input credential. A plurality of different types of credential readers are each selectively attachable and removable from an attachment interface when the outer base is attached to the door to electrically connect the selected one of the plurality of different types of credential readers to the control circuit. The selected credential reader receives data from a user or credential and generates the input credential. A communication module is operable to communicate with a device separate from the electronic door lock.

22 Claims, 12 Drawing Sheets

Related U.S. Application Data continuation of application No. 16/354,952, filed on Mar. 15, 2019, now Pat. No. 10,801,235, which is a continuation of application No. 15/340,850, filed on Nov. 1, 2016, now abandoned, which is a continuation of application No. 13/618,712, filed on Sep. 14, 2012, now abandoned, which is a continuation of application No. 12/480,532, filed on Jun. 8, 2009, now Pat. No. 8,272,241.

(60) Provisional application No. 61/076,476, filed on Jun. 27, 2008.

(51) Int. Cl.

*E05B 47/06* (2006.01)
*E05B 63/00* (2006.01)
*G07C 9/00* (2020.01)

(52) U.S. Cl.

CPC ...... *E05B 63/0056* (2013.01); *G07C 9/00896* (2013.01); *E05B 2047/0048* (2013.01); *G07C 9/00944* (2013.01); *Y10T 70/5155* (2015.04); *Y10T 70/5416* (2015.04); *Y10T 70/5792* (2015.04); *Y10T 70/5832* (2015.04); *Y10T 70/625* (2015.04); *Y10T 70/65* (2015.04); *Y10T 70/7062* (2015.04); *Y10T 70/7068* (2015.04); *Y10T 70/7107* (2015.04); *Y10T 70/7113* (2015.04); *Y10T 70/7136* (2015.04); *Y10T 70/7441* (2015.04); *Y10T 292/57* (2015.04); *Y10T 292/91* (2015.04)

(58) Field of Classification Search

CPC ............ G07C 9/00944; Y10T 70/5155; Y10T 70/5416; Y10T 70/5792; Y10T 70/5832; Y10T 70/625; Y10T 70/65; Y10T 70/7062; Y10T 70/7068; Y10T 70/7107; Y10T 70/7113; Y10T 70/7136; Y10T 70/7441; Y10T 292/57; Y10T 292/91

USPC .............................................................. 70/91

See application file for complete search history.

(56) References Cited

U.S. PATENT DOCUMENTS

| | | | | |
|---|---|---|---|---|
| 4,884,835 | A | 12/1989 | Smallegan et al. | |
| 5,157,952 | A | 10/1992 | Lin | |
| 5,177,987 | A | 1/1993 | Shen | |
| 5,190,327 | A | 3/1993 | Lin | |
| 5,481,890 | A | 1/1996 | Millman | |
| 5,617,749 | A | 4/1997 | Park | |
| 5,636,882 | A | 6/1997 | Hook | |
| 5,666,833 | A | 9/1997 | Gao et al. | |
| 5,727,406 | A | 3/1998 | Banducci | |
| 5,855,130 | A | 1/1999 | Rorabacher et al. | |
| 5,894,277 | A | 4/1999 | Keskin et al. | |
| 5,934,117 | A | 8/1999 | Shen | |
| 5,941,108 | A | 8/1999 | Shen | |
| 6,085,561 | A | 7/2000 | Yao | |
| 6,099,053 | A | 8/2000 | Huang | |
| 6,241,295 | B1 | 6/2001 | Hoogendoorn | |
| 6,264,255 | B1 | 7/2001 | Fortune | |
| 6,286,347 | B1 | 9/2001 | Frolov | |
| 6,330,816 | B1 | 12/2001 | O'Connor | |
| 6,360,569 | B1 | 3/2002 | Huang | |
| 6,486,793 | B1 | 11/2002 | Buccola | |
| 6,695,365 | B2 | 2/2004 | Chong et al. | |
| 6,869,116 | B2 | 3/2005 | Dalsing | |
| 6,926,319 | B2 | 8/2005 | Bates et al. | |
| 6,997,024 | B2 | 2/2006 | Etlicher | |
| 7,073,829 | B2 | 7/2006 | Kuo et al. | |
| 7,082,794 | B2 | 8/2006 | Shen et al. | |
| 7,137,657 | B2 | 11/2006 | Wu et al. | |
| 7,155,946 | B2 | 1/2007 | Lee et al. | |
| 7,178,373 | B2 | 2/2007 | Shen et al. | |
| 7,387,005 | B2 | 6/2008 | Huang et al. | |
| 8,272,241 | B2 * | 9/2012 | Brown ............... | G07C 9/00896 292/357 |
| 2002/0125992 | A1 | 9/2002 | Harwood | |
| 2002/0196123 | A1 | 12/2002 | Diehl et al. | |
| 2004/0025548 | A1 | 2/2004 | Eller et al. | |
| 2005/0131551 | A1 | 6/2005 | Ruutu et al. | |
| 2005/0204167 | A1 | 9/2005 | Conlin et al. | |
| 2007/0107477 | A1 | 5/2007 | Fawcett et al. | |
| 2007/0289012 | A1 | 12/2007 | Baird | |
| 2008/0084299 | A1 | 4/2008 | Fisher et al. | |
| 2010/0283579 | A1 | 11/2010 | Kraus et al. | |

* cited by examiner

ELECTRONIC DOOR WITH KEY-IN-LEVER FEATURE

RELATED APPLICATION

This present application is a divisional of U.S. patent application Ser. No. 17/069,452 filed Oct. 13, 2020 and issued as U.S. Pat. No. 11,739,561, which is a continuation of U.S. patent application Ser. No. 16/354,952 filed Mar. 15, 2019 and issued as U.S. Pat. No. 10,801,235, which is a continuation of U.S. patent application Ser. No. 15/340,850 filed Nov. 1, 2016 and now abandoned, which is a continuation of U.S. patent application Ser. No. 13/618,712 filed Sep. 14, 2012 and now abandoned, which is a continuation of U.S. patent application Ser. No. 12/480,532 filed Jun. 8, 2009 and issued as U.S. Pat. No. 8,272,241, which claims the benefit of U.S. Provisional Patent Application No. 61/076,476 filed Jun. 27, 2008, the contents of each application hereby incorporated herein by reference in their entireties.

BACKGROUND

The present invention relates to access control systems, and more particularly to an electronic door lock used in an access control system.

Access control systems may be used in commercial, residential, or other settings.

Commercial access control systems are typically used to protect places of business and are subject to stricter standards than residential access control systems. For example, the Builders Hardware Manufacturers Association (BHMA) and American National Standards Institute (ANSI) define standards that locks used in access control systems must pass to be certified. BHMA and ANSI further define different grades of locks, each grade having a different set of standards that must be met by the locks. If the device is properly tested following all the requirements of the predefined standards, then the device may be certified and sold with a BHMA Certified Mark, ANSI mark, or other mark.

SUMMARY

In one construction, the invention provides an electronic door lock for a door having a first side and a second side. The electronic door lock includes an escutcheon including a first aperture. A non-circular spring cage extends through the first aperture, and the spring cage includes a second aperture. A spring cage spindle at least partially extends through the second aperture, and the spring cage spindle extends from the spring cage. The spring cage spindle includes a third aperture. A key cylinder is received in the third aperture. A handle including a fourth aperture receives the key cylinder and the spring cage spindle, and a fastener is received by the handle. The fastener is configured to couple the handle to the spring cage spindle and inhibit movement of the handle with respect to the spring cage spindle.

In another construction, the invention provides an electronic door lock for a door having a first side and a second side. The electronic door lock includes an escutcheon including a first aperture and a plurality of ribs. A spring cage extends through the first aperture and is positioned adjacent the plurality of ribs. The spring cage includes a second aperture. A spring cage spindle at least partially extends through the second aperture. The spring cage spindle extends from the spring cage and includes a third aperture. A key cylinder is received in the third aperture, and a handle includes a fourth aperture that receives the key cylinder and the spring cage spindle.

In another construction, the invention provides an electronic door lock that mounts to a door. The door includes an inner side and an outer side, and the electronic door lock is operable to control access to an access controlled area positioned adjacent the inner side of the door. The electronic door lock includes an outer base connected to the outer side of the door, an inner base connected to the inner side of the door, a locking mechanism coupled to the door and movable between a locked position and an unlocked position in response to a control signal, and a control circuit disposed within the inner base and operable to generate the control signal in response to the presentation of an input credential. An attachment interface is at least partially formed as part of the outer base. A plurality of different types of credential readers are each selectively attachable and removable from the attachment interface when the outer base is attached to the door to electrically connect the selected one of the plurality of different types of credential readers to the control circuit. The selected credential reader receives data from a user or credential and generates the input credential in response to the data. A communication module is connected to the control circuit and is operable to communicate with a device that is separate from the electronic door lock.

In another construction, the invention provides an electronic door lock that mounts to a door. The door includes an inner side and an outer side, and the electronic door lock is operable to control access to an access controlled area positioned adjacent the inner side of the door. The electronic door lock includes an inner base supported by the inner side, an attachment interface coupled to the outer side and including a mounting portion, a locking mechanism coupled to the door and movable between a locked position and an unlocked position in response to a control signal, and a reader selected from a keypad, proximity detector, proximity detector with built-in keypad, magnetic stripe reader, magnetic stripe reader with built-in keypad, and biometric reader. Each of the keypad, proximity detector, proximity detector with built-in keypad, magnetic stripe reader, magnetic stripe reader with built-in keypad, and biometric reader are removably mountable to the attachment interface. A control circuit is coupled to the door and configured to selectively move the locking mechanism between the locked position and the unlocked position to control access to the access controlled area. The control circuit includes software or firmware operable to receive an input from the selected reader. The control circuit is further operable to generate the control signal in response to the input. A communication module is connected to the control circuit, is positioned in the inner base, and is operable to communicate with a device that is separate from the electronic door lock. The communication module is one of a wired communication module and a wireless communication module. Each of the wired communication module and the wireless communication module is selectively removable and replaceable without disturbing the locking mechanism and without disturbing the control circuit.

In yet another construction, the invention provides an access control system for controlling access to one or more secured spaces based upon an access control decision. The access control system includes a plurality of electronic door locks. Each of the electronic door locks is mounted to one of a plurality of doors. Each door includes an inner side and an outer side. Each of the electronic door locks includes an outer base connected to the outer side, an inner base connected to the inner side, and a locking mechanism coupled to the door and movable between a locked position and an unlocked position in response to a control signal. A control circuit is disposed within the inner base and operable to transmit data in response to an input credential. An attachment interface is at least partially formed as part of the outer base. One of a plurality of different types of credential readers is selectively attachable and removable from the attachment interface when the outer base is attached to the door to electrically connect a selected one of the plurality of different types of credential readers to the control circuit to provide the input credential. A communication module is connected to the control circuit. The communication module is selectively removable and replaceable without disturbing the locking mechanism and without disturbing the control circuit and is operable to communicate with a device that is separate from the electronic door lock. An access control panel is configured to communicate with the communication module of each of the plurality of locks to receive the data. A server is configured to communicate with the access control panel. One of the access control panel and the server effects the access control decision and generates the control signal.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
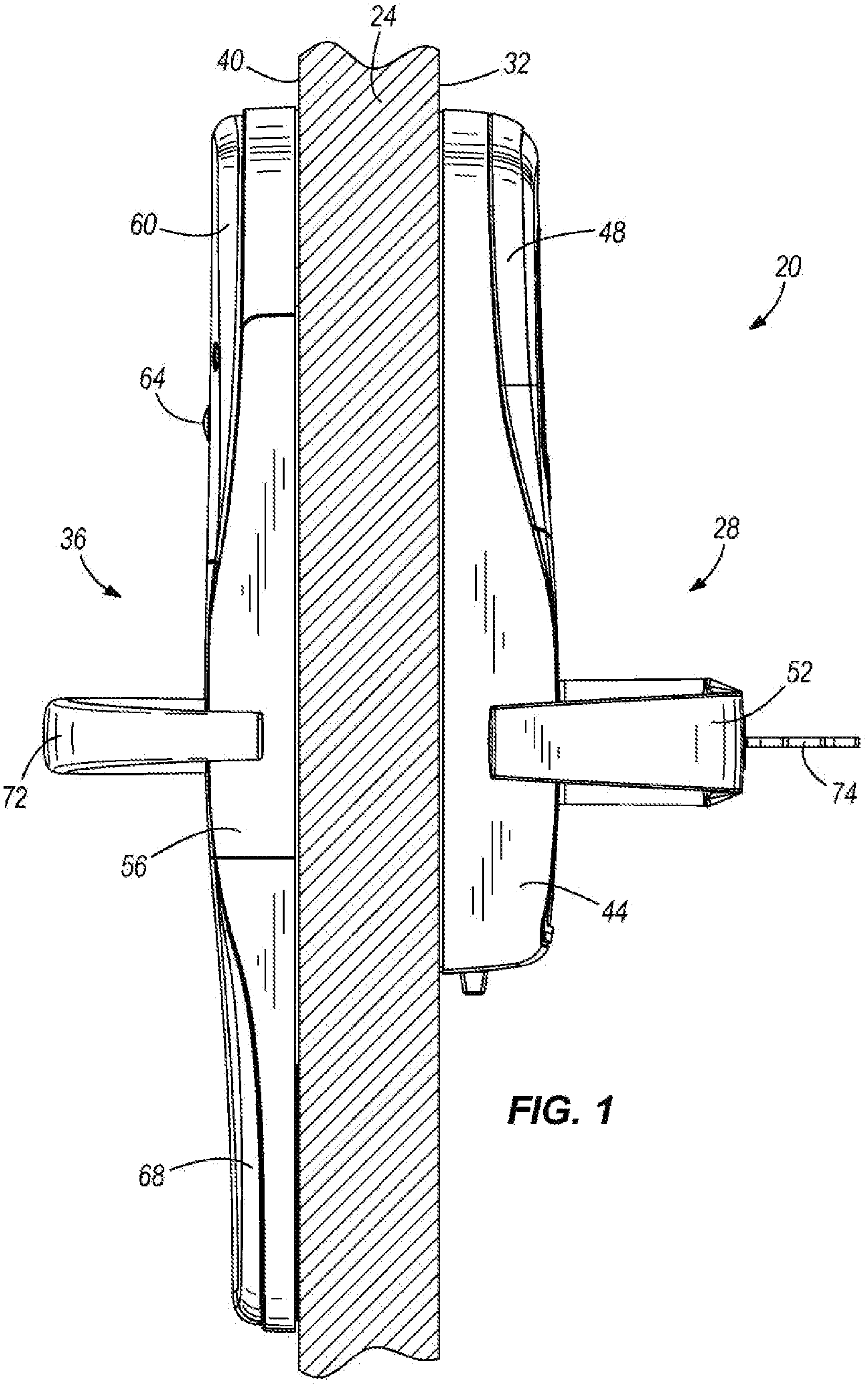
FIG. 1 is a side view of an electronic door lock mounted to a door.

FIG. 1 illustrates an electronic door lock 20 mounted to a door 24 and suitable for use in an access control system 27. The door lock 20 includes an outer portion 28 mounted on an outer side 32 of the door 24 and an inner portion 36 mounted on an inner side 40 of the door 24. The outer portion 28 of the door lock 20 includes an outer escutcheon 44, a credential reader 48, and an outer handle 52. The inner portion 36 of the door lock 20 includes an inner escutcheon 56, a communication module cover 60, an optional push-button 64, a battery cover 68, and an inner handle 72.

The terms “inner” and “outer” are used herein to differentiate the two sides of the door and should not be considered as limiting the invention in any way. In constructions in which one side of the door is in a secured space and the other side of the door is not (e.g., an entry door into a building), the inner side would be in the secured space. However, some constructions may position a door within a space in which both sides of the door are located within a secure space. In these constructions, one side of the door would be considered the inner side while the opposite side would be the outer side. Thus, constructions are possible in which components or features described as being positioned on an inner side of the door could be positioned on an outer side of the door and visa versa. Thus, the terms “inner” and “outer” are sometimes replaced herein with “first” and “second”.

Figure 9:
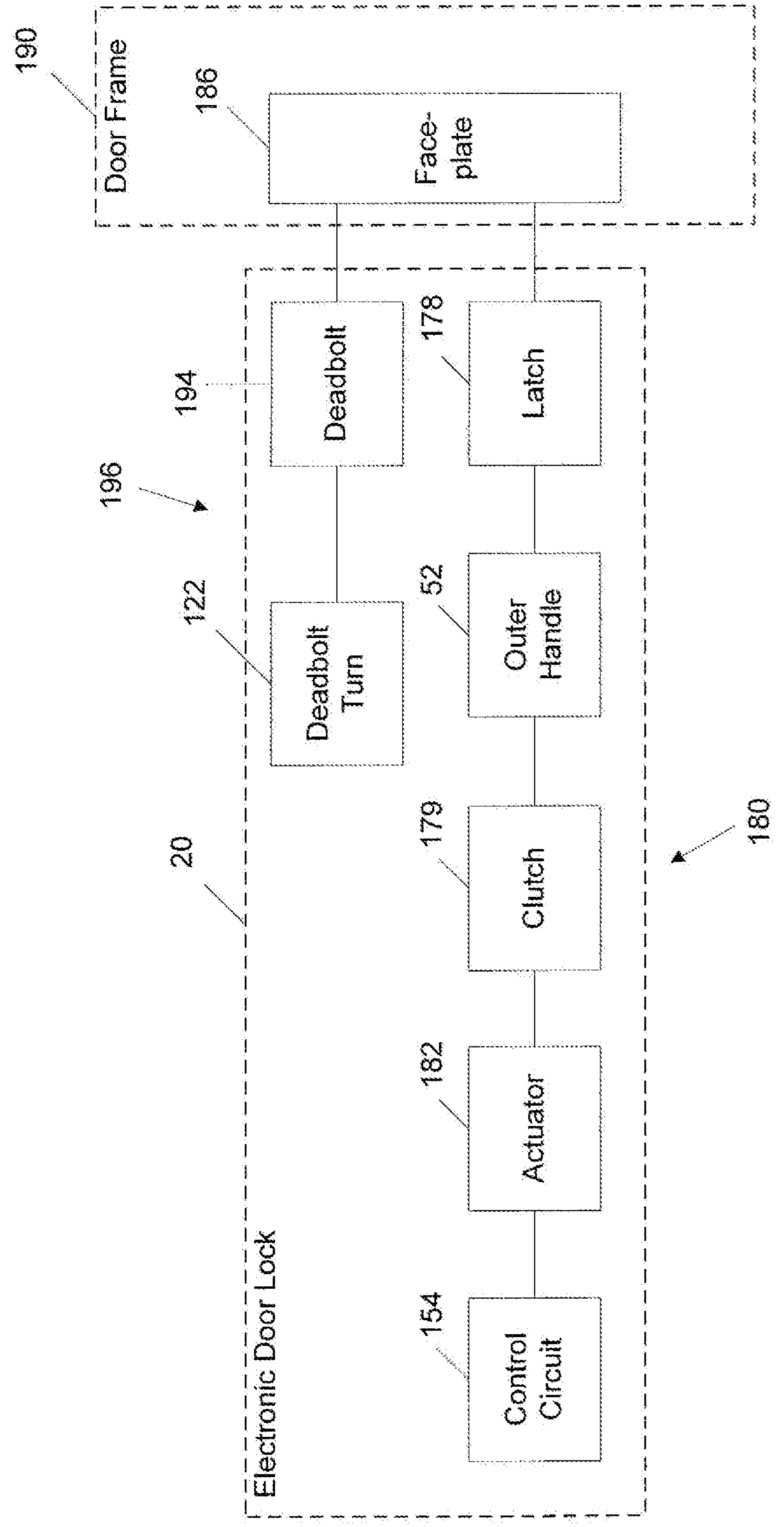
FIG. 9 is a schematic illustration of an electromechanical system of the door lock of FIG. 1.

The door lock 20 includes an electromechanical system that allows for the movement of a locking mechanism 180 including an actuator 182, a clutch 179, and a latch 178, which are schematically illustrated in FIG. 9. The latch 178 is movable by the inner handle 72 and the outer handle 52 between a locked position and an unlocked position. When the latch 178 is moved to the locked position, the latch 178 is extended away from the door lock 20 into an opening in a face plate 186 mounted to a door frame 190. The latch 178 inhibits movement of the door 24 when in the extended position. When the latch 178 is moved to the unlocked position, the latch 178 is retracted into the door lock 20 and out of engagement with the face plate 186 to allow a user to open the door 24.

The actuator 182 moves the clutch 179 between an engaged position and a disengaged position to selectively enable and disable the outer handle 52. When the clutch 179 is in the disengaged position, the clutch 179 disengages the outer handle 52 and the latch 178 such that movement of the outer handle 52 does not cause movement of the latch 178. Thus, when the clutch 179 is in the disengaged position, a user positioned adjacent the outer side 32 cannot gain access to the inner side 40. When the clutch 179 is in the engaged position, the clutch 179 is engages with the outer handle 52 and the latch 178 such that movement of the outer handle 52 causes the latch 178 to move. Thus, when the clutch 179 is in the engaged position, a user positioned adjacent the outer side 32 can move the latch 178, open the door 24, and gain access to the inner side 40. The actuator 182 can include an electric motor, a solenoid, a piezoelectric actuator, a linear actuator, a mechanically actuated device, a different suitable actuator, or a combination thereof to move the clutch 179 to the desired position when a user uses an appropriate key 74 or presents an appropriate credential to the credential reader 48 to allow the user to operate the outer handle 52 and move the latch 178. In some constructions, the actuator 182 is configured to selectively enable and disable the inner handle 72 or both the inner and outer handle.

Figure 2:
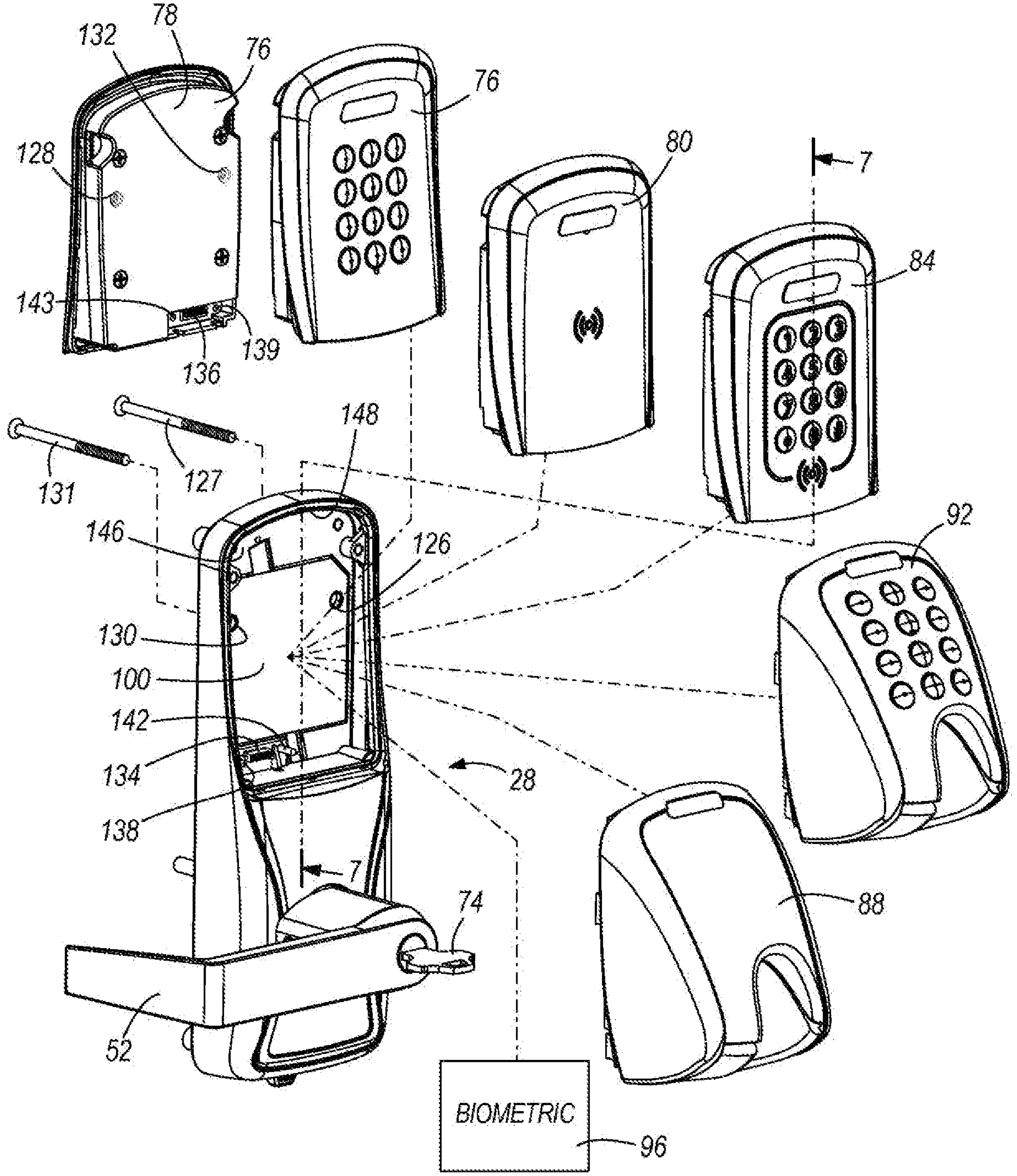
FIG. 2 is a schematic illustration of the electronic door lock of FIG. 1 and a plurality of credential readers configured for mounting on the electronic door lock.

FIG. 2 illustrates the outer portion 28 of the door lock 20. A plurality of input devices (also referred to as credential readers 48) are illustrated including but not limited to a keypad 76, a proximity detector 80, a proximity detector with built-in keypad 84, a magnetic stripe reader 88, a magnetic stripe reader with a built-in keypad 92, and a biometric reader 96. For clarity, the credential reader 48 could include any one of a keypad 76, a proximity detector 80, a proximity detector with built-in keypad 84, a magnetic stripe reader 88, a magnetic stripe reader with a built-in keypad 92, and a biometric reader 96 as well as other types of credential readers such as a smartcard reader, a smartcard reader with built-in keypad, a multitech reader, and a multitech reader with built-in keypad. In fact, the modularity of the arrangement described herein would allow for the use of virtually any type of credential reader desired. The credential readers may include other features such as audio beepers and visual interfaces that include light emitting diodes (LEDs). The credential readers 48 are configured to mount to a mounting portion of an attachment interface 100, which will be described in greater detail with respect to FIG. 4. Each credential reader 48 is self-contained and includes all the necessary electrical components and firmware required for the credential reader 48 to receive an input credential from a user and output the credential or a signal corresponding to the credential to a control circuit 154 (FIG. 9) of the door lock 20. For example, the keypad credential reader 76 is configured to receive a user input (e.g., a numeric or alphanumeric code) and output the entered credential to the control circuit 154 of the door lock 20. The biometric credential reader 96 is configured to receive a user input (e.g., a fingerprint, a scan of the user's hand, a vocal input, a scan of the user's face, a scan of the user's eye, or other biometric data), process the user input, and output data to the control circuit 154 that is representative of the user input. In some embodiments, the biometric credential reader 96 may receive user input in the form of a fingerprint and output the fingerprint data to the control circuit of the door lock 20. In other embodiments, the biometric credential reader 96 may process the input fingerprint and output a statistical representation of the fingerprint data or some other value representative of the fingerprint or the user that provided the fingerprint.

Figure 5:
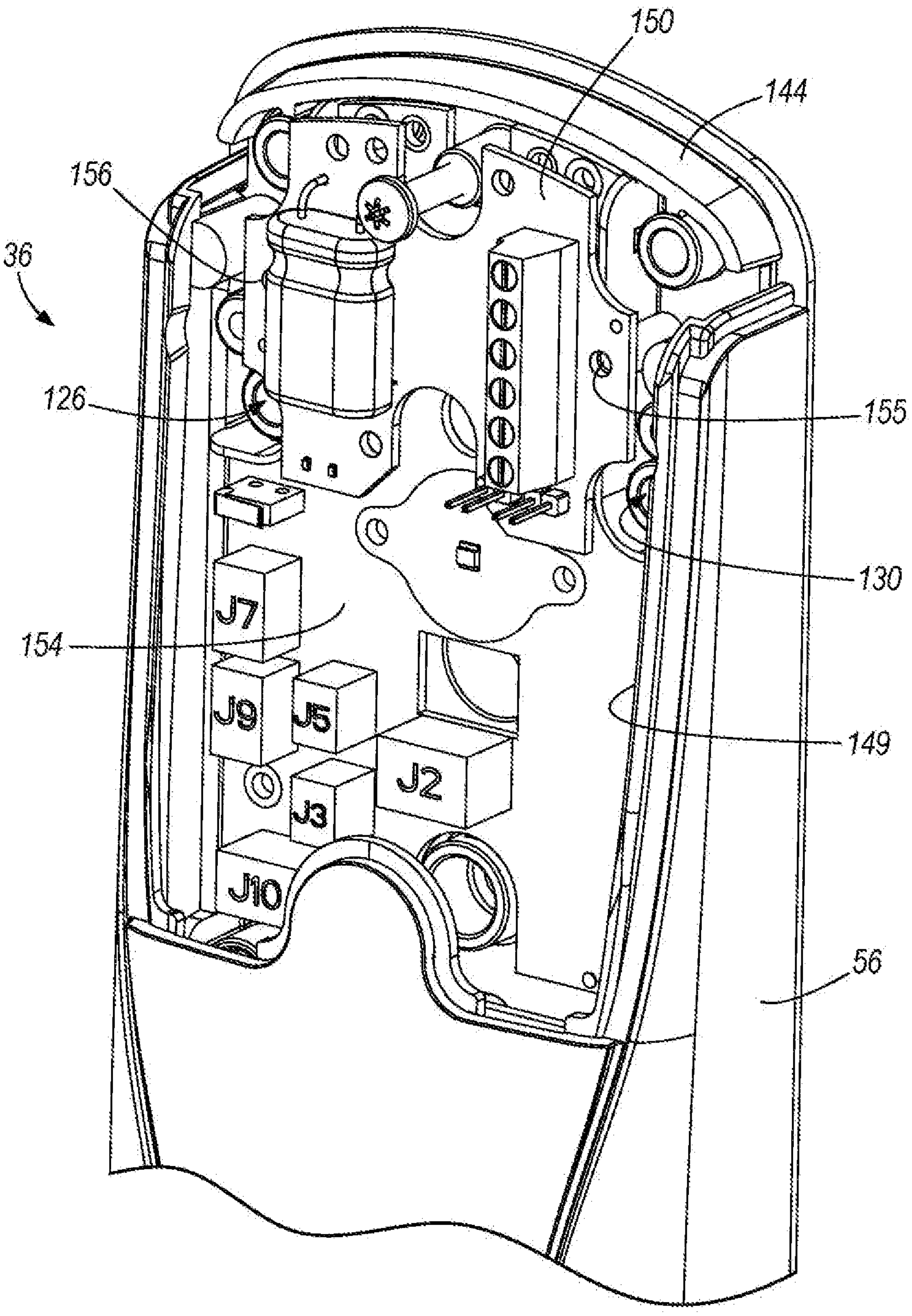
FIG. 5 is a perspective view of a portion of the electronic door lock of FIG. 1 illustrating a communication module.

The control circuit 154 of the door lock 20, shown in FIG. 5, includes software and/or firmware that is operable to receive a variety of credentials or other signals from a variety of different types of credential readers 48. Thus, the user has the option to purchase a door lock and separately purchase any of a variety of credential readers 48, some of which are illustrated in FIG. 2. The software of the control circuit 154 is configured to recognize the type of credential reader 48 attached to the door lock 20 and thus knows what input to expect from the credential reader 48. For example, if a keypad 76 is attached, the software expects a user code. If a magnetic stripe reader with a built-in keypad 92 is attached, the software may be configured to expect both a user code and a magnetic stripe input. The software is configured to receive a signal, from each of a plurality of different types of credential readers 48, that corresponds to the credential input by the user. Thus, no modification to the software is required when a user replaces one type of credential reader (e.g., keypad 76, proximity detection 80, magnetic stripe reader 88, biometric 96, etc.) with a different type of credential reader. Of course, modifications to the software may be performed as desired by the user.

As the user's security needs or preferences change, the user may purchase a new set of credential readers 48 to change the access control system from using one type of credential to a different type of credential. Thus, the user may selectively remove and attach desired credential readers 48 in the field (e.g., at the user's place of business). Of course, the credential readers 48 may also be selectively removed and attached at a factory or place of manufacture. In this way, the electronic door lock 20 contains a high degree of modularity, interchangeability, and upgradeability. Only some credential readers 48 are illustrated in FIG. 2 and discussed herein for exemplary purposes, and the invention is not limited to the types of credential readers 48 discussed and illustrated herein.

Figure 3:
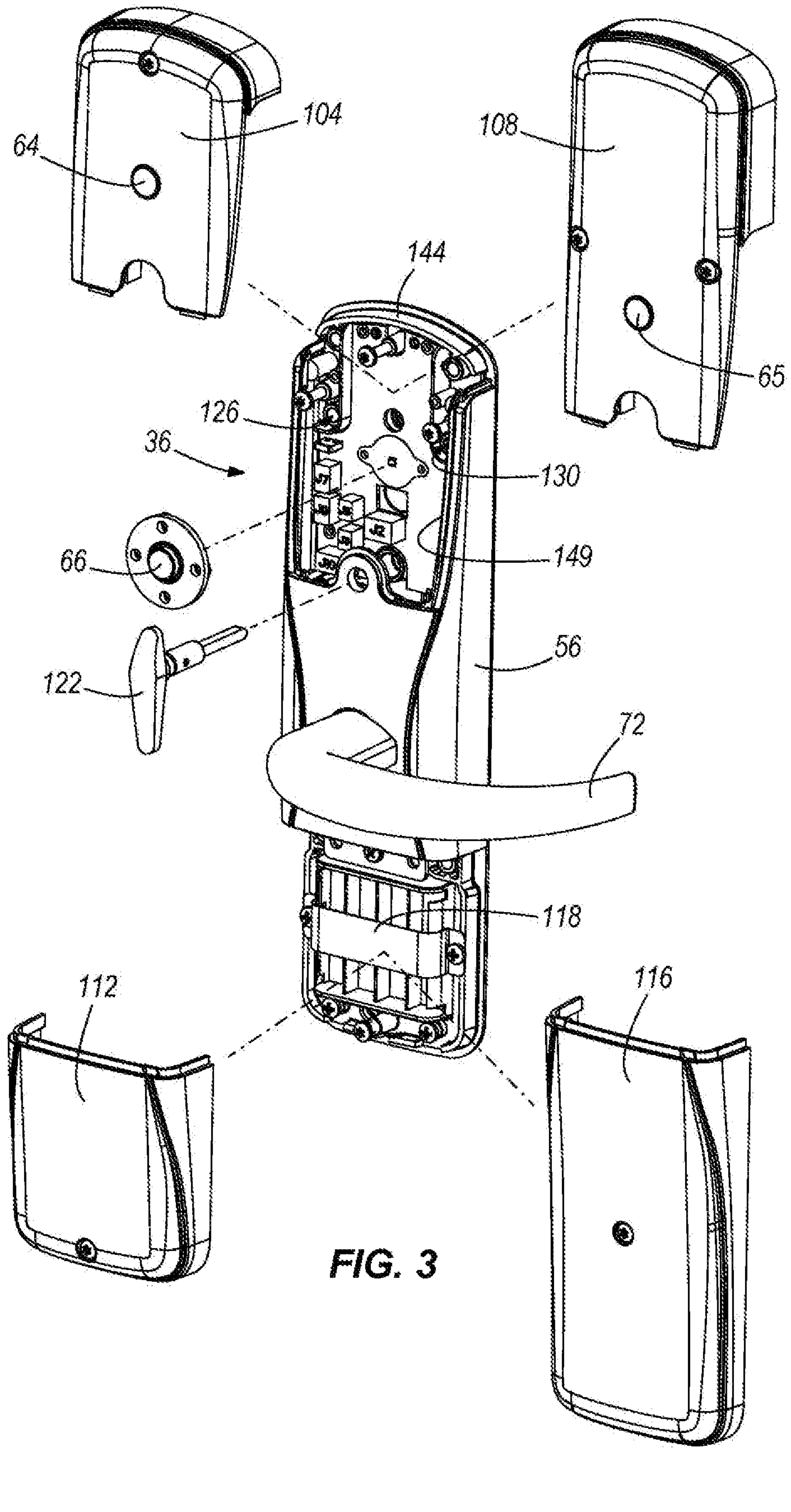
FIG. 3 is a schematic illustration of the electronic door lock of FIG. 1 and a plurality of communication module covers and a plurality of battery covers configured for mounting on the electronic door lock.

FIG. 3 illustrates the inner portion 36 of the door lock 20 which includes an inner base 144 and the inner escutcheon 56 that defines an inner escutcheon aperture 149. A plurality of communication module covers 104, 108 are illustrated. One cover 104 is configured to cover a wired communication module, and a second cover 108 is configured to cover a wireless communication module, which will be described in detail with respect to FIGS. 5 and 6. The covers 104 and 108 may also be used to substantially close or cover the inner escutcheon aperture 149 when no communication module is present (e.g., offline locks). A first battery cover 112 and a second battery cover 116 are configured to mount to the inner escutcheon 56 to cover the batteries and battery holder 118. A four-battery battery holder 118 is illustrated in FIG. 3, as the construction of FIG. 3 includes 4 batteries. However, if the user desires longer battery life or the credential reader 48 requires more power to operate, the user can use an eight-battery battery holder and mount battery cover 116 to the inner escutcheon 56 to cover the batteries and the battery holder. The eight-battery battery holder is formed by attaching a second four-battery battery holder to the door lock and connecting the second four-battery battery holder to the first four-battery battery holder 118 in order to create an eight-battery battery holder.

The inner portion 36 of the door lock 20 has an optional secondary locking mechanism 196 that includes a deadbolt turn 122 and a deadbolt 194. The deadbolt turn 122 is accessible from inside the access controlled area and is coupled to the deadbolt 194 to allow a user to move the deadbolt 194 (FIG. 9) from a locked position, in which it is extended and engaged in a second opening in the faceplate 186, to an unlocked position, in which the deadbolt 194 is retracted into the door lock 20 and out of engagement with the second opening in the faceplate 186. Thus, a user inside the access controlled area may turn the deadbolt turn 122 to move the deadbolt 194 into engagement with the opening in the faceplate 186, thus inhibiting other users from entering the access controlled area even when an appropriate key 74 is used or when appropriate credentials are presented.

The communication module covers 104, 108 include optional outer pushbuttons 64, 65 mounted to the communication module covers 104, 108, respectively. A corresponding internal button 66 is coupled to the inner base 144. When the cover is mounted on the inner escutcheon 56, the outer pushbutton 64 or 65 aligns with the corresponding internal button 66. When a user positioned inside the access controlled area pushes the pushbutton 64, 65, the corresponding internal button 66 is actuated and sends an electrical signal to the control circuit. The control circuit receives the signal and processes the signal. The internal button 66 may be configured for providing a privacy, lock, unlock, or other function. The control circuit may be programmed to ignore signals received from the pushbutton to effectively disable the pushbutton 66, or the control circuit may be programmed to change the operating mode of the door lock for some period of time or until a second signal is received. For example, the door lock may change from a standard mode of operation to a restricted access mode. When the pushbutton 66 is activated, the door lock 20 may only allow a select number of users to enter the access controlled area, temporarily denying assess to all others who present valid credentials. Of course, other operating modes are also possible and may be predefined and programmed into the electronic door lock software. If the communication module cover 104, 108 does not include an outer pushbutton 64, 65, then the corresponding internal button 66, while still present in the door lock 20, will not be actuatable during normal use.

Figure 4:
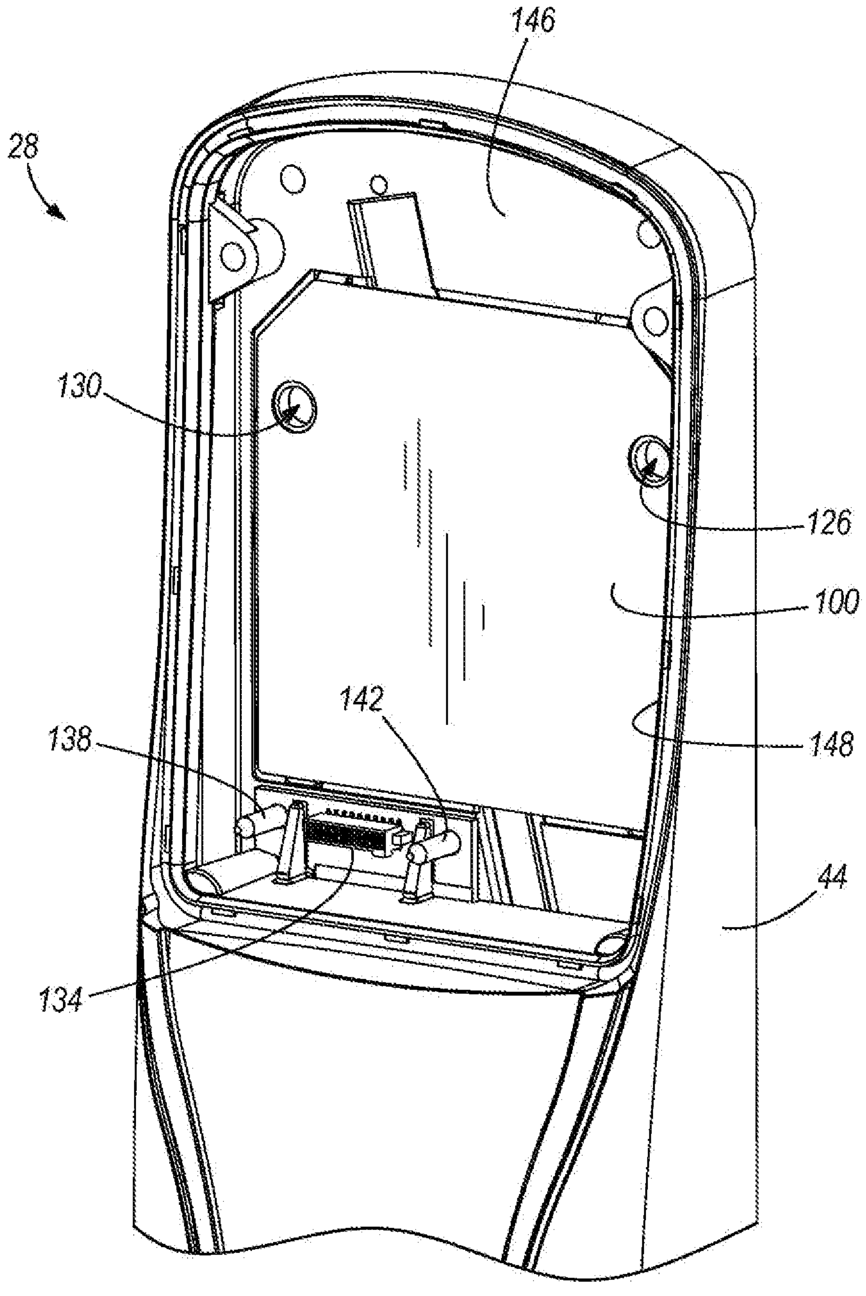
FIG. 4 is a perspective view of the electronic door lock of FIG. 1 including an attachment interface.

FIG. 4 illustrates the attachment interface 100 on the outer portion 28 of the door lock 20. The attachment interface 100 is substantially flat and includes mounting apertures 126, 130, a connector 134, and alignment posts 138, 142. The connector 134 extends from the attachment interface 100 in a direction away from the door. The illustrated connector 134 is a standard twenty pin female connector. Of course, in other embodiments, the connector 134 may be positioned in a different location on the attachment interface. In addition, the connector may be a different connector, such as an 8 pin connector, a male connector, or other suitable connectors. In addition, the attachment interface 100 may be a different shape or size if desired.

The credential reader 48, such as one of the credential readers 76, 80, 84, 88, 92, 96 illustrated in FIG. 2 is designed with a corresponding attachment portion 78 and is removably mounted to the attachment interface 100 of the door lock 20. The credential reader 48 includes a second connector 136 that mates with the first connector 134 when the credential reader 48 is mounted on the attachment interface 100. The alignment posts 138, 142 are received in corresponding apertures 139, 143, respectively, in the credential reader 48 to aid in the alignment of the connector 134 of the credential reader 48. Once the credential reader 48 is positioned on the attachment interface 100, mounting fasteners 127, 131 are inserted from the inner side 40 of the door 24. The mounting fasteners 127, 131 pass through apertures 126, 130 and are threadably received in threaded apertures 128, 132 in the credential reader 48 to secure the credential reader 48 to the door lock 20. Because the mounting fasteners 127, 131 secure the credential reader 48 from the inside of the door 24, there is no access to the fasteners 127, 131 from the outer portion 28 of the lock 20 and security is increased. In other embodiments, the attachment interface 100 may include fewer or more alignment posts, differently shaped or positioned alignment posts, or no alignment posts whatsoever. Of course, the attachment interface 100 may include more or less apertures and more or less mounting fasteners if desired. It should be noted that other alignment features could also be employed as alignment posts. In addition, the alignment posts could be formed on the credential readers 48, with corresponding apertures formed in the door lock 20 to facilitate alignment and attachment.

FIG. 5 illustrates a wired communication module 150 that may be used with the door lock 20 of FIG. 1. The inner base 144 is mounted to the inner side 40 of the door. The control circuit 154 is positioned in the inner base 144 and may include electrical components 154 such as an integrated circuit, central processing unit, memory, etc. The wired communication module 150 is removably mounted on the inner base 144 and is electrically connected to the control circuit 154. The wired communication module 150 communicates using wired communications such as serial communication, RS-485, RS-232, Ethernet, etc. The wired communication module 150 is secured to the inner base 144 by inserting fasteners through apertures 155 and 156. The cover 104 illustrated in FIG. 2 is configured to mount to the inner escutcheon 56 to substantially cover the wired communication module and an antenna. Of course, in other constructions, the wired communication module 150 may be used with non-lock devices including but not limited to panel interface modules, wireless reader interfaces, wireless status monitors, wireless portable readers and the like.

Figure 6:
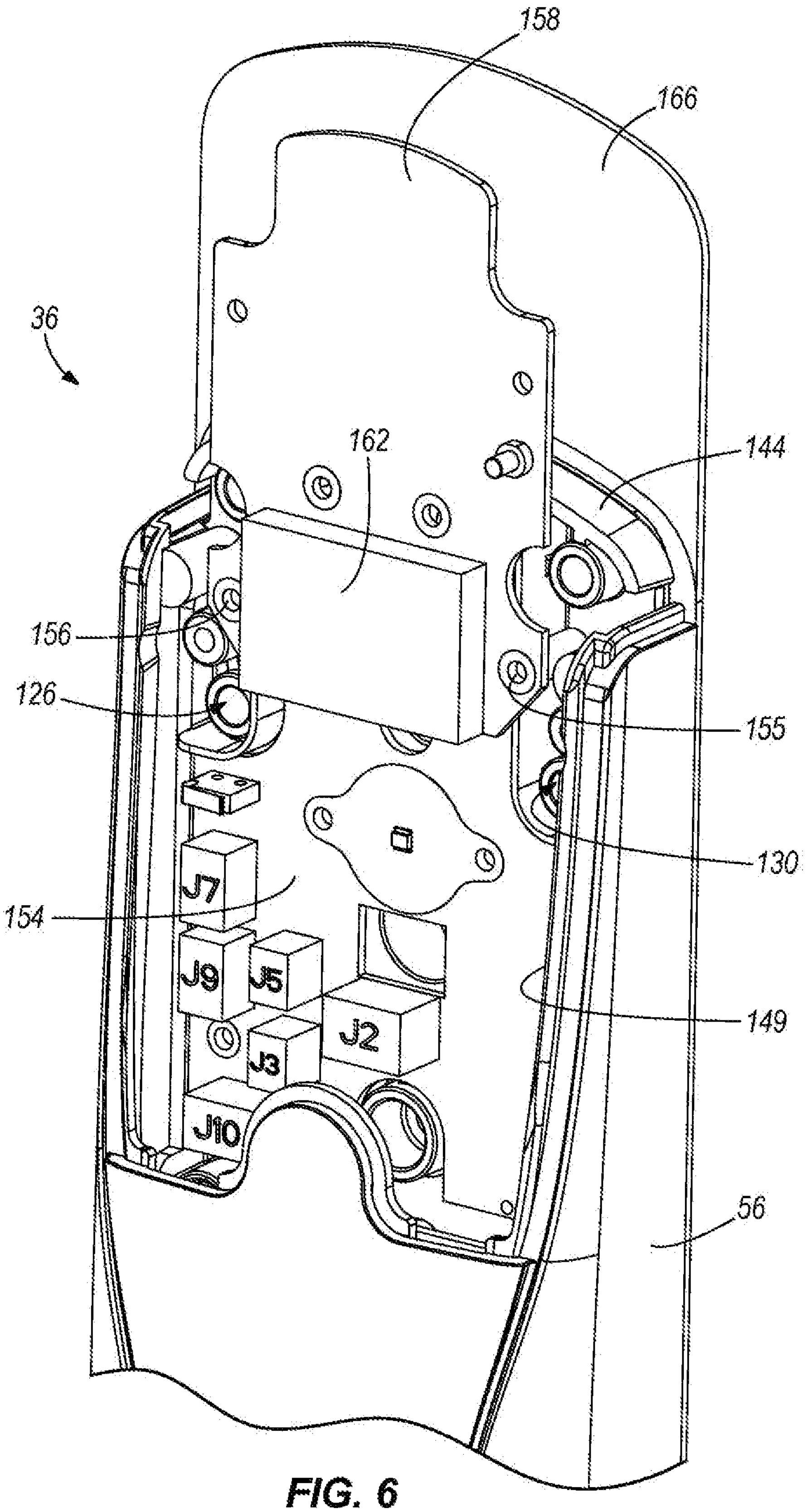
FIG. 6 is a perspective view of a portion of the electronic door lock of FIG. 1 illustrating another construction of a communication module.

If a user wishes to change to, for example, a wireless communication module 158, the user may remove the cover 104 to gain access to the communication module 150. Easy access is granted to the wired communication module 150 through the inner escutcheon aperture 149, and the wired communication module 150 may be removed by removing fasteners in apertures 155 and 156. The wireless communication module 158 may be mounted in the same position to provide wireless capability to the door lock 20, as illustrated in FIG. 6. Thus, the wired communication module 150 may be removed and replaced from the lock without removing the inner escutcheon 56 and without damaging or disturbing the control circuit 154 and the locking mechanism 180.

With reference to FIG. 6, the wireless communication module 158 is removably mounted on the inner base 144 and is electrically connected to the control circuit 154 when mounted thereon. The wireless communication module 158 includes a radio frequency ("RF") shield 162 and additional circuitry, such as a wireless transmitter or transceiver and the antenna to wirelessly communicate with other devices. Thus, the wireless communication module 158 is larger than the wired communication module 150. As illustrated in FIG. 6, the wireless communication module 158 extends above the inner portion 36 of the door lock 20. A metallic extension 166 is positioned adjacent the door 24 and extends above the door lock 20 a distance that is similar to the wireless communication module 158. The metallic extension 166 contains an adhesive layer for mounting to the door 24. The metallic extension 166 ensures a consistent RF radiation pattern when the door 24 is formed of wood or metal. The RF shield 162 is provided between the wireless communication module 158 and the cover 108 when the cover 108 is mounted on the inner escutcheon 56 to substantially cover the communication module 158. The wireless communication module cover 108 is larger than the wired communication module cover 104 to accommodate the larger wireless communication module 158. In this manner, the inner portion 36 of the door lock is able to accommodate substantially any size of communication module provided that the module is configured to mount to the inner base 144 in a similar position and a cover is designed to mate with the inner escutcheon 56 to substantially cover the communication module. Thus, the door lock 20 is configured to accept a variety of communication modules that are interchangeable, providing the door lock 20 with a greater modularity, flexibility, and interchangeability.

The wireless communication module 158 can be configured to communicate using 900 MHz, WIFI, ZIGBEE, Z-wave, 2.4 GHz, 868 MHz, other radio frequencies, and other standards as desired. The wireless communication module 158 may also be used in non-lock devices such as panel interface modules, wireless portable readers, wireless reader interfaces, wireless status monitors or other wireless devices used in the access control system 27. In offline locks, a communication module is not present. However, the offline lock still includes sufficient space for the addition of a communication module should one be desired. The user can convert to an online wired or wireless lock simply by attaching the wired communication module 150 or the wireless communication module 158 as described above.

Figure 7:
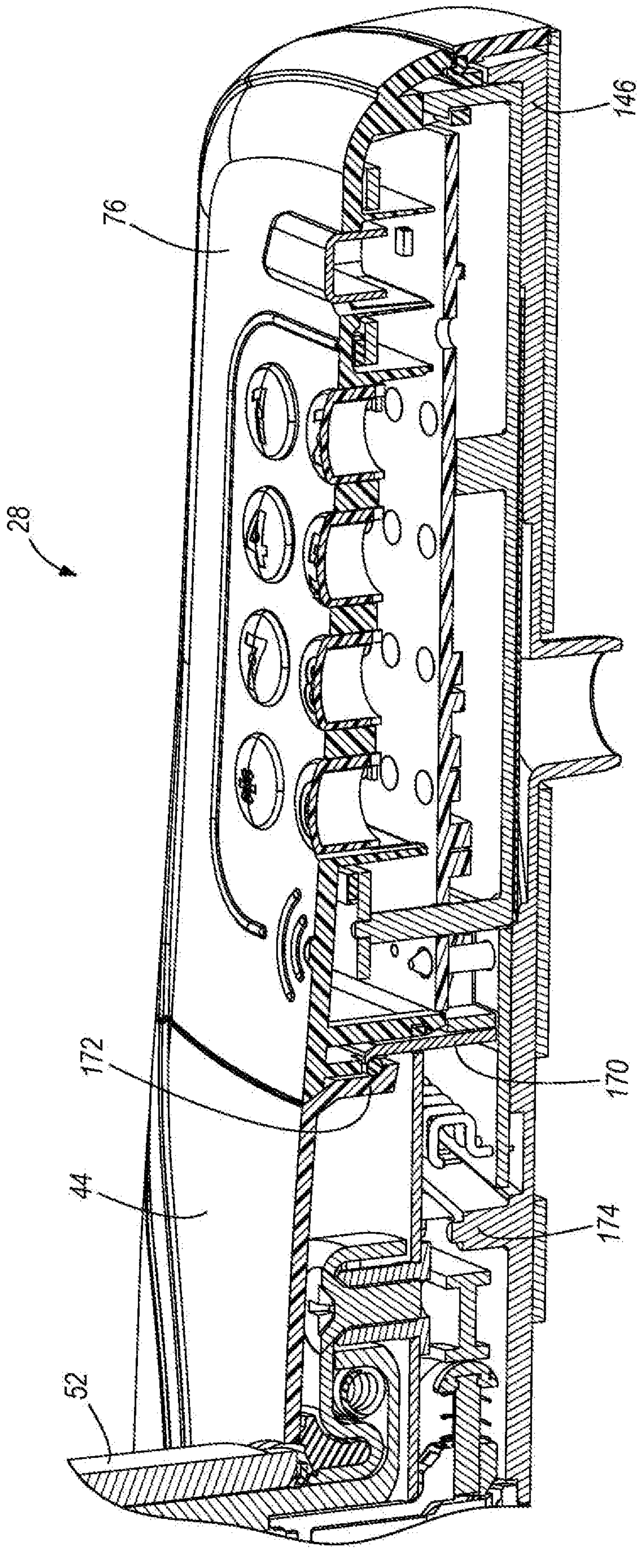
FIG. 7 is a sectional view of the electronic door lock of FIG. 1 taken along line 7-7 of FIG. 2.

With reference to FIG. 7, the outer portion 28 of the door lock 20 includes a first anti-tamper wall 170 and a second anti-tamper wall 174 that inhibit access to the locking mechanism 180 from the outer portion 28 of the door lock. Specifically, the anti-tamper walls 170 and 174 are positioned to inhibit access to the locking mechanism 180 from an outer escutcheon aperture 148 in the outer escutcheon 44. The first anti-tamper wall 170 extends in a horizontal direction from the outer base 146 to a flange 172 of the outer escutcheon 44 to provide a horizontal barrier between the locking mechanism 180 and the aperture 148. Thus, if an intruder breaks the credential reader 76 and gains access to the upper portion of the door lock 20, the intruder's access to the locking mechanism 180 is blocked by the first anti-tamper wall 170. To increase security, a second anti-tamper wall 174 is positioned below the first anti-tamper wall 170 to provide a second barrier between the upper portion of the door lock 20 and the locking mechanism 180. The second anti-tamper wall 174 extends horizontally from the outer base 146 to at least partially block access to the locking mechanism 180.

Figure 8:
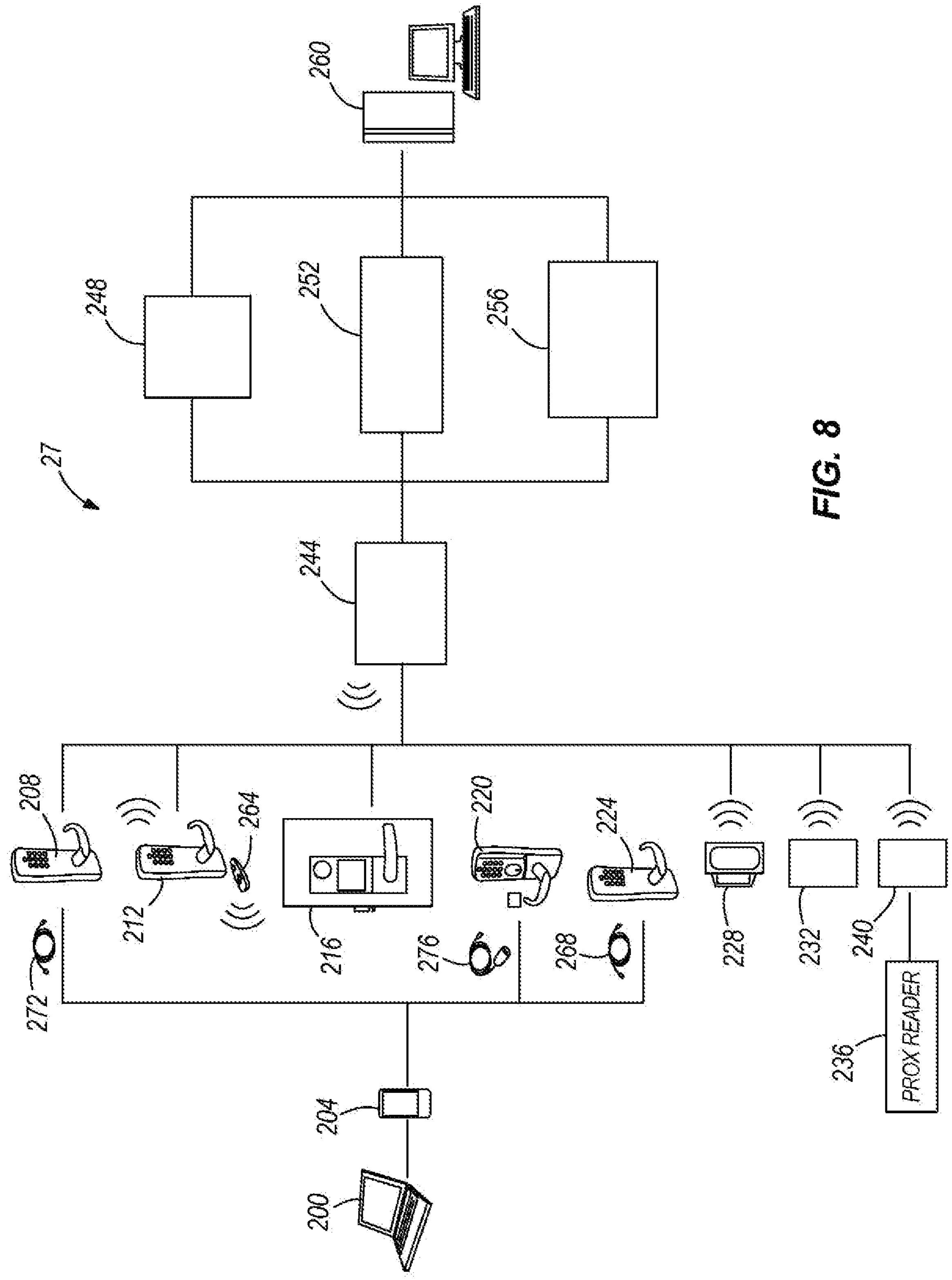
FIG. 8 is a schematic illustration of an access control system including the electronic door lock of FIG. 1.

FIG. 8 schematically illustrates an access control system 27 that may include the electronic door lock 20 of FIGS. 1-7. The system includes an optional laptop computer 200, a personal device assistant (PDA) 204, a plurality of door locks and communication modules 208, 212, 216, 220, 224, 228, 232, 236, 240, a panel interface device 244 (e.g., panel interface board (PIB) or panel interface module (PIM)), an access control panel (ACP) 248, 252, or 256, and a server 260.

The laptop 200 and PDA 204 may be used to configure parameters in the access control system 27. The door locks 208, 212, 216, 220, 224 may include one type of door lock or a plurality of types of door locks (e.g., online or offline locks, mortise locks, cylindrical locks, exit locks, etc). The door locks may include wireless credential readers, wired credential readers or a combination thereof. In addition, the access points (e.g., doors, gates, elevators, etc.) may include proximity readers 236, a wireless reader interface (WRI) 240, a wireless status monitor (WSM) 232, a wireless portable reader (WPR) 228, a universal serial bus (USB) enabled electronic lock 224, an electronic lock including a standard electrical connection 220, a BLUETOOTH enabled lock 212 with corresponding dongle 264, or other devices not listed herein. The laptop 200, PDA 204, or a combination thereof may be used during installation and upgrades of the access control system 27. For example, if the door locks require a software upgrade, the upgrade may be performed through the laptop 200 or PDA 204. The laptop 200 and PDA 204 may communicate wirelessly with the door locks or through a wired connection such as a USB cable 268, 272 or other electrical connection 276.

The door locks and communication modules 208, 212, 216, 220, 224, 228, 232, 236, 240 are configured to communicate with the panel interface device 244. The communication may be wireless, with the use of a wireless communication module 158, or the communication may be wired, with the use of a wired communication module 150. The panel interface device 244 is configured to communicate with the ACP 248 via a wired connection. In other constructions, the panel interface device 244 may communicate with third party original equipment manufacture (OEM) equipment 256 or a different control panel, such as BRIGHT BLUE 248. The ACP 252 is configured to communicate with a server 260 such as SMS Express, Select Premium Enterprise system (S/P/E), other software packages, and other third party OEM software and servers. The access control decision may be made by any of the control circuit 154, the panel interface device 244, the ACP 252, 248, or 256, and the server 260. It is also contemplated that the access control decision may be made in the credential reader or the lock itself.

When a user desires access to the access controlled area, the user approaches the credential reader 48, which is positioned on the outer portion 28 of the door lock 20. The user uses the credential reader 48 to enter credentials. This could include entering a pin, swiping a card, providing a biometric sample and the like. The credential reader 48 provides the received credentials or a signal including data representative of the received credentials to the control circuit 154. The control circuit 154 may include an onboard database that has been previously saved and that includes a list of authorized users and the credentials or data associated with each user. The control circuit 154 determines if the received credentials or representative data are valid and makes an access decision. Alternatively, the control circuit 154 may transmit the data to the access control panel 248, 252, or 256, either directly or through the panel interface device 244. The access control panel 248, 252, or 256 may include a database that the access control panel 248, 252, or 256 uses to make an access decision, or the access control panel 248, 252, or 256 may communicate directly with a server 260 that makes the access decision. One of the server 260, access control panel 248, 252, or 256, and the control circuit 154 generates a control signal in response to the access decision.

The control signal is communicated to the control circuit 154, and the control circuit 154 processes the control signal and uses the control signal to actuate the locking mechanism 180 to enable the outside lever and allow the outer handle 52 to move latch 178 to one of the locked position and the unlocked position to provide or inhibit access to the access controlled area. If the control circuit 154 generates the control signal, then the control circuit 154 uses the control signal to operate the locking mechanism 180 accordingly.

The modular design of the electronic door lock 20 provides users with flexibility and an easier way to manage repairs and upgrades of the door locks 20. The user may purchase credential readers 48 separately from the door lock 20. Thus, if a user wishes to change an access control system 27 that uses, for example, keypad credential readers 76 to an access control system that uses, for example, biometric credential readers 96, the user can purchase biometric credential readers 96 for each of the door locks 20. The keypad credential readers 76 can be removed and replaced with the biometric credential readers 96. Because the control circuit 154 includes the necessary software to receive, for example, both keypad credential data and biometric data, no software modification is required. After the biometric credential reader 96 is mounted to the door lock 20 and the appropriate databases are updated with the users biometric data, the access control system 27 will function properly.

For example, some users may wish to change from a security system 27 with keypad entry to a biometric security system 27. To achieve the desired change, the following steps may be performed. The user removes the communication module cover 104 from the inside portion 36 of the door lock 20 (FIG. 3). The user removes the fasteners 127, 131 from the apertures 126 and 130 (FIGS. 2 and 3), the keypad 76 is removed from the attachment interface 100 in the outer portion 28 of the door lock 20, and the biometric credential reader 96 is mounted to the attachment interface 100. The fasteners 127, 131 are reinserted in the apertures 126 and 130 to secure the biometric credential reader 96 to the door lock 20. The communication module cover 104 may then be replaced on the inside portion 36 of the door lock 20.

In some situations, a user may want to change from a wired security system 27 to a wireless security system 27. To do this, the wired communication module 150 (FIG. 5) is removed by removing fasteners from apertures 155 and 156. The metallic extension 166 is mounted to the inner side 40 of the door 24. In some embodiments, the metallic extension 166 is provided with an adhesive backing and a removable film. The film is removed to expose the adhesive, and the metallic extension 166 is mounted to the inside of the door 24 above the inner base 144. The wireless communication module 158 (FIG. 6) is mounted to the door lock 20, and the fasteners are inserted in the apertures 155 and 156 to secure the wireless communication module 158 thereto. The communication module cover 108 is positioned over the wireless communication module 158 and is received by the inner escutcheon 56. The fasteners are replaced in the apertures 155 and 156 to secure the cover 108 to the door lock 20. Of course, the above steps may be performed in a different order. Thus, the communication module 150 or 158 is removable and replaceable without any disassembly of, or damage to the locking mechanism 180, the inner base 144, and the inner escutcheon 56. Furthermore, the communication module 150 or 158 is removable and replaceable without disturbing the control circuit 154 or the locking mechanism 180.

Figure 10:
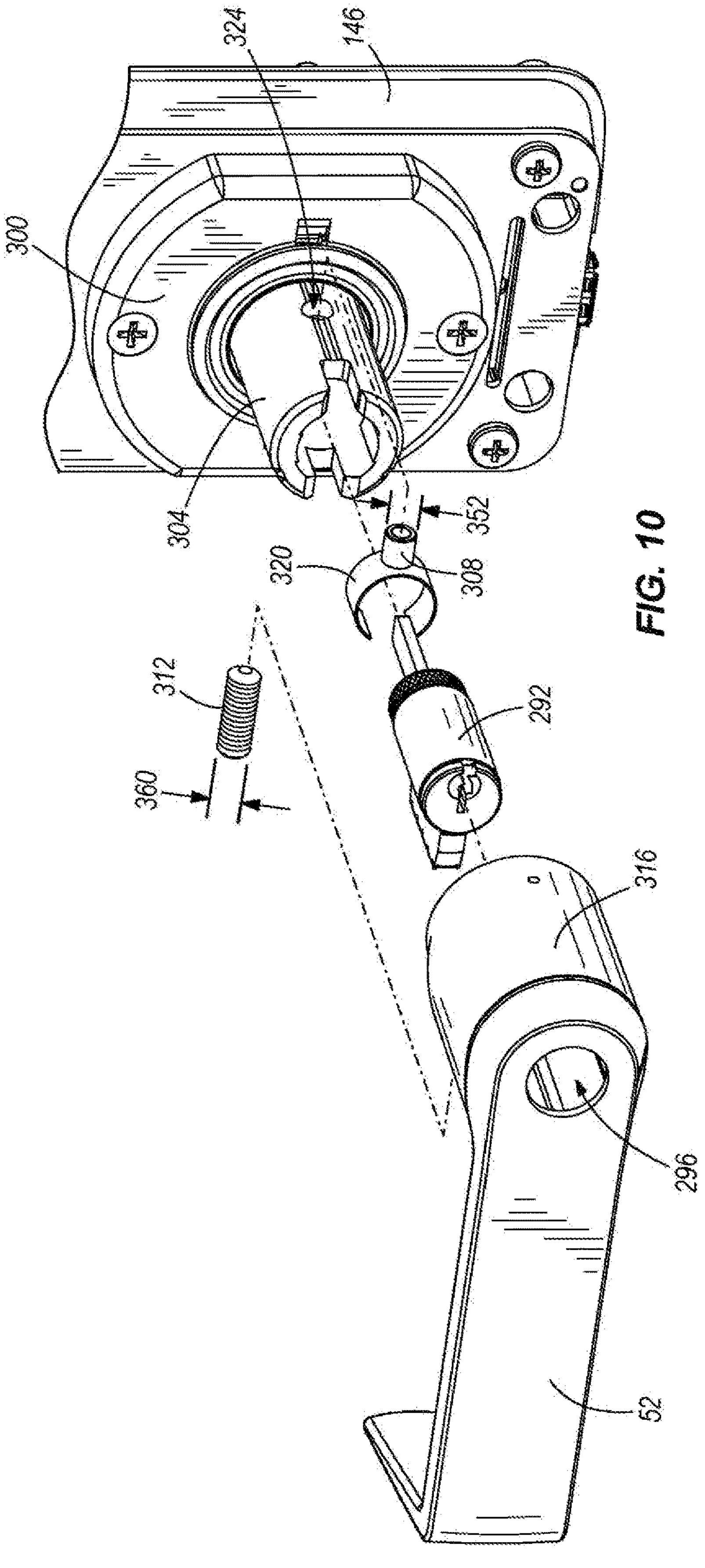
FIG. 10 is a partial exploded view of a handle and key cylinder of the electronic door lock of FIG. 1.

The electronic door lock 20 also includes a key-in-lever feature. As illustrated in FIG. 10, a key cylinder 292 is positioned in the handle 52 (sometimes referred to as a lever). As illustrated, the key cylinder 292 is positioned within an aperture 296 in the outer handle 52. To secure the key cylinder 292 in the outer handle 52, the door lock 20 includes a spring cage 300, a spring cage spindle 304, a lever catch pin 308, and an additional fastener 312.

Figure 11:
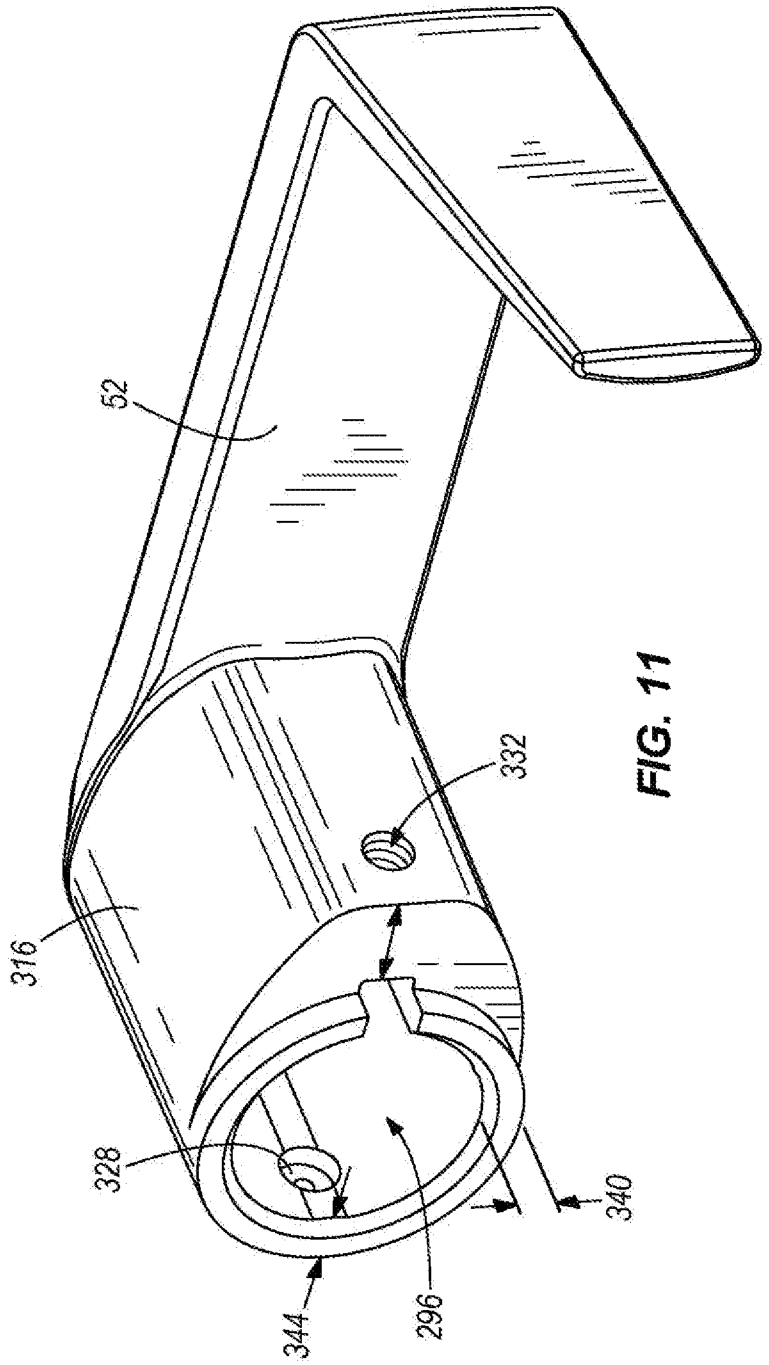
FIG. 11 is a perspective view of the handle of the electronic door lock of FIG. 1.

The outer handle 52 includes an aperture 296 that receives the spring cage spindle 304, the lever catch pin 308, and the key cylinder 292. More specifically, the lever catch pin 308 includes a band of material 320 that is positioned around the key cylinder 292 when assembled. The key cylinder 292 and lever catch pin 308 are received in the spring cage spindle 304 to inhibit rotation of the lever catch pin 308 with respect to the spring cage spindle 304. The lever catch pin 308 is received in an aperture 324 in the spring cage spindle 304. This arrangement also inhibits movement of the lever catch pin 308 and the key cylinder 292 in an axial direction with respect to the spring cage spindle 304. With reference to FIGS. 10 and 11, the lever catch pin 308 extends through the aperture 324 and is at least partially received in an aperture 328 formed in the outer handle 52 to inhibit axial and rotational movement of the outer handle 52 with respect to the spring cage spindle 304. When the handle 52 is rotated, the spring cage spindle 304 is also rotated. Finally, the fastener 312 is threadably inserted in a second aperture 332 in the outer handle 52 and passes through the second aperture such that the fastener 312 is adjacent the spring cage spindle 304. In the illustrated construction, the fastener 312 is a set screw that secures a hub 316 of the handle to the spring cage spindle 304. Of course, in other constructions, different fasteners can be used.

The Builders Hardware Manufacturers Association (BHMA) and the American National Standards Institute (ANSI) define standards that locks used in access control systems must meet to be certified. BHMA and ANSI further define different grades of locks, each having a different set of standards that must be met by the locks. If the lock is properly tested, following all the requirements of the standard, then the device is certified and can be sold with a BHMA Certified Mark, ANSI Mark, or other mark. Furthermore, different types of locks may be subject to different testing requirements. For example, the ANSI 156.13 standard defines, among other things, three tests that a mortise lock with a key-in-lever feature must pass to be Grade 1 certified. The three tests include a 3600 pound axial pull on lever test, a 175 foot-pound locked lever torque test, and a 10-blow vertical impact test, which will be described in detail below.

To perform the 3600 pound axial pull on lever test, a machine grips the hub 316 of the outer handle 52. Then the machine applies a force of increasing magnitude to the hub 316 in a direction substantially perpendicular to the inner base 144 and in a direction away from the inner base 144. The force applied by the machine is increased until the door lock fails 20. Failure is defined by separation of the lever hub 316 from the spring cage spindle 304, which would allow a user to gain access to the key cylinder 292 and locking mechanism 180. If the failure occurs when the force exerted is greater than 3600 pounds, the door lock 20 passes the 3600 pound axial pull on lever test. To increase the amount of force the door lock 20 can withstand before failing, several modifications were made to the previously designed door locks.

To increase the amount of force that is required to cause failure of the door lock 20 during the 3600 pound axial pull on lever test, the materials and dimensions of the outer handle 52, lever catch pin 308, spring cage 300, and spring cage spindle 304 were determined using modeling analysis. The material of the outer handle 52 was changed from Die Cast Zinc Zamak 3 to Investment Cast Steel ASTM A148. With reference to FIG. 11, the maximum thickness 336 of the lever hub 316 was increased by 57% (i.e., from 0.420 inches to 0.660 inches), the intermediate thickness 340 was increased by 38% (i.e., from 0.250 inches to 0.345 inches), and the minimum thickness 344 was increased by 27% (i.e., from 0.130 inches to 0.165 inches). The material of the spring cage spindle 304 was changed from AISI-1008-CRS to Investment Cast Steel ASTM A148. The thickness 348 of the spring cage spindle 304 was increased by 200% (i.e., from 0.060 inches to 0.180 inches). The material of the lever catch pin 308 was changed from AISI-12L14 Steel to a three part pin that includes an outer pin formed from AISI-1060 Steel, an inner pin formed from AISI-12L14 Steel, and a pin cap formed of AISI 12L14 Steel. The outer diameter 352 of the lever catch pin 308 was increased by 28% (i.e., from 0.189 inches, to 0.241 inches). The spring cage 300 is formed from AISI-1008-CRS. The thickness 356 (FIG. 12) of the spring cage 300 was increased by 33% (i.e., from 0.060 inches to 0.080 inches). The additional set screw 312 is a ¼-20 steel screw having a 0.25 inch diameter 360.

Figure 12:
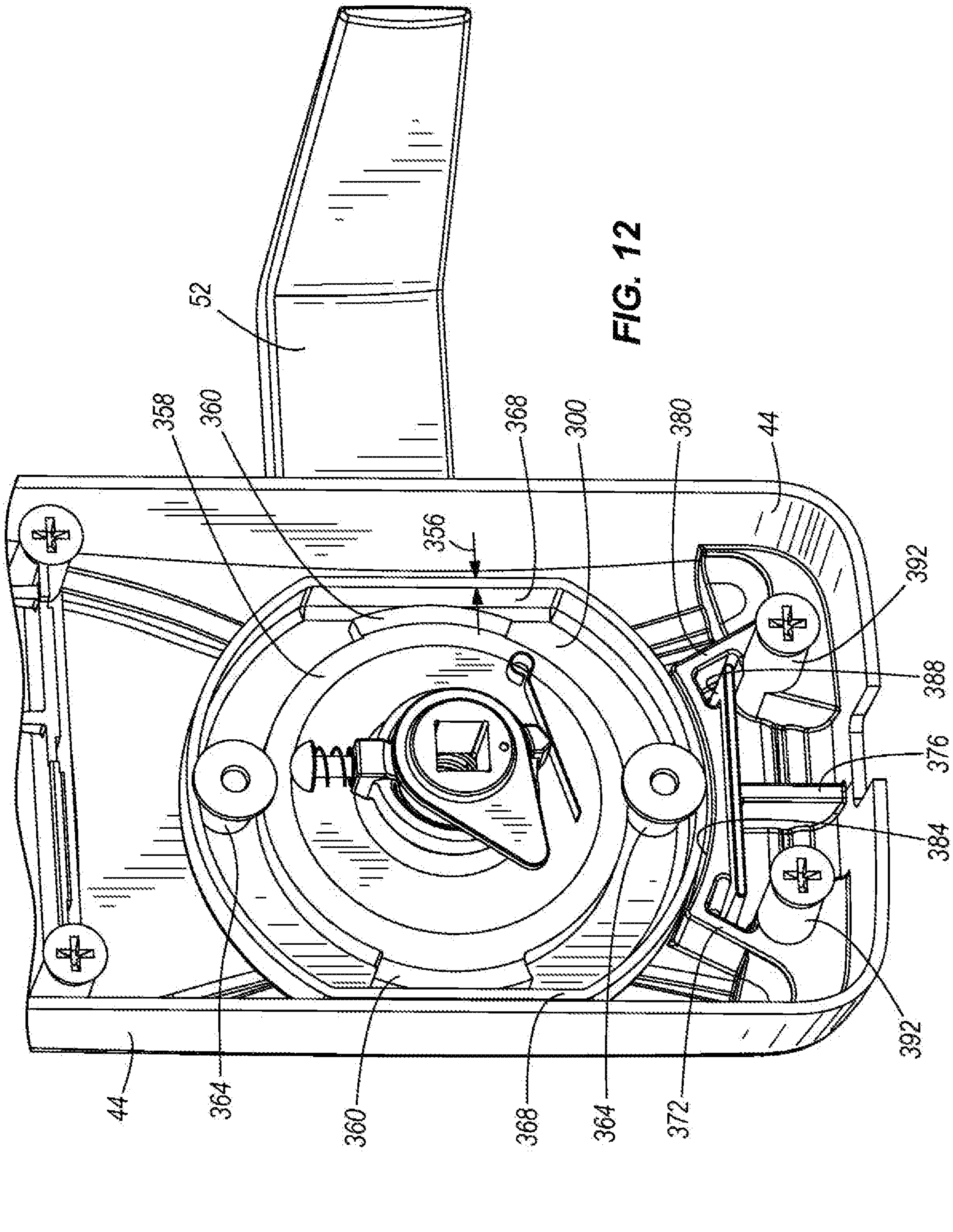
FIG. 12 is a perspective view of the electronic door lock of FIG. 1 illustrating a spring cage and escutcheon ribs.

To perform the 175 foot-pound locked lever torque test a force of approximately 175 foot-pounds is applied to the outer handle 52 after the outer handle 52 is fully rotated. With reference to FIG. 12, rotation of the outer handle 52 rotates a platform 358 until flanges 360 on the platform 358 abut bosses 364 positioned in the spring cage 300. The bosses 364 inhibit further rotation of the lever 52 by inhibiting further rotation of the platform 358. If enough torque is applied to the handle 52, the bosses may fail and allow the platform 358 to continue to rotate. The increased dimensions mentioned above aid in the amount of torque the door lock 20 can withstand. However, if the bosses 364 fail before 175 foot-pounds of force is applied to the handle 52, then the door lock 20 fails the test. To increase the amount of torque the door lock 20 can withstand before failure, additional features were added to the door lock 20. More specifically, the shape of the spring cage 300 was designed to inhibit failure of the door lock 20 by inhibiting rotation of the spring cage 300. The spring cage 300 is substantially circular except for the formation of two substantially straight side walls 368. The side walls 368 are positioned adjacent the walls of the outer escutcheon 44 such that when a torsional force is applied to the spring cage 300, the walls 368 of the spring cage press against the walls of the outer escutcheon 44 to transfer the load to the outer escutcheon 44.

To perform the 10-blow vertical impact test, a force of 75 foot-pounds is repeatedly exerted on the lever 52 to simulate an intruder's attempt to gain access to the locking mechanism 180. For example, a sledge hammer with a 22 pound head dropped from a height of 40 inches will impart a force of approximately 75 foot-pounds on the outer handle 52. A finite element analysis (FEA) model of the door lock 20 was developed and analyzed for eleven simulated blows of 75 foot-pounds on the outer handle of the FEA model. The door lock 20 was strengthened as mentioned above by increasing the thicknesses 336, 340, 344, and 348 of the outer handle 52 and the spring cage 300. In addition, the outer handle 52 is formed from a stronger material (e.g., Investment Cast Steel ASTM A148).

The modifications listed above aid in the number of blows the lock 20 can withstand before failing. In addition, three escutcheon ribs 372, 376, and 380 are included adjacent the spring cage 300 to further increase the strength of the door lock 20, and to allow the door lock 20 to absorb additional force. The escutcheon ribs 372, 376, and 380 are formed as one piece connected by an arcuate portion 384 adjacent the spring cage 300. The escutcheon ribs 372, 376, and 380 can also be referred to as inner walls. When a substantially vertical force is exerted on the outer handle 52, the spring cage 300 presses against the arcuate portion 384 and transfers the load to the arcuate portion 384. The arcuate portion 384 further transfers the load to the escutcheon ribs 372, 376, and 380. The escutcheon ribs 372 and 380 are positioned to substantially surround two bosses 392 formed in the outer escutcheon 44. The two bosses 392 receive the load and transfer it to the escutcheon 44. One load transfer path is defined from the outer handle 52 to the spring cage 300, to the escutcheon ribs 372 and 380, to the bosses 392, and to the outer escutcheon 44. A second load transfer path is defined from the outer handle 52 to the spring cage 300, to the escutcheon rib 376, and to the outer escutcheon 44. In other constructions, a different number and shape of escutcheon ribs may be present to transfer forces from the spring cage 300 to the escutcheon 44.

Thus, the invention provides, among other things, an electronic door lock that offers a key-in-lever feature. Various features and advantages of the invention are set forth in the following claims.

What is claimed is:

1. A door lock apparatus, comprising:

an escutcheon configured for mounting to a door, the escutcheon including a first side wall;

a non-circular spring cage including a first flat side wall; and a spindle rotatably mounted to the spring cage for rotation relative to the spring cage about a rotational axis; and wherein the first flat side wall of the non-circular spring cage is engaged against the first side wall of the escutcheon to inhibit rotation of the spring cage relative to the escutcheon about the rotational axis.

2. The door lock apparatus of claim 1, wherein the escutcheon further includes a second side wall; and wherein the non-circular spring cage further includes a second flat side wall engaged against the second side wall of the escutcheon to further inhibit rotation of the spring cage relative to the escutcheon about the rotational axis.

3. The door lock apparatus of claim 1, wherein the first side wall at least partially defines a non-circular aperture in which the non-circular spring cage is positioned.

4. The door lock apparatus of claim 1, further comprising:

a handle mounted to the spindle; and a key cylinder mounted within the spindle and the handle.

5. The door lock apparatus of claim 1, further comprising a plurality of ribs positioned adjacent the spring cage and operable to transfer forces exerted on the spring cage to the escutcheon.

6. The door lock apparatus of claim 5, further comprising a support wall connected with the plurality of ribs and positioned adjacent a wall portion of the non-circular spring cage.

7. The door lock apparatus of claim 6, wherein the support wall is an arcuate support wall, and wherein the wall portion of the non-circular spring cage is an arcuate wall portion of the non-circular spring cage.

8. A door lock apparatus, comprising:

an escutcheon configured for mounting to a door, the escutcheon including a first aperture partially bound by a first side wall;

a spring cage positioned in the first aperture, the spring cage including a second side wall; and a spindle rotatably mounted to the spring cage for rotation relative to the spring cage about a rotational axis; and wherein the second side wall of spring cage is engaged against the first side wall of the escutcheon to inhibit rotation of the spring cage relative to the escutcheon about the rotational axis.

9. The door lock apparatus of claim 8, wherein the spring cage is non-circular.

10. The door lock apparatus of claim 9, wherein the second wall of the spring cage comprises at least one flat side wall.

11. The door lock apparatus of claim 10, wherein the second wall of the spring cage comprises a pair of flat side walls.

12. The door lock apparatus of claim 8, wherein the first side wall and the second side wall each comprise a flat side wall.

13. The door lock apparatus of claim 8, wherein the escutcheon further includes a third side wall; and wherein the spring cage further includes a fourth side wall; and wherein the fourth side wall of the spring cage is engaged against the third side wall of the escutcheon to further inhibit rotation of the spring cage relative to the escutcheon about the rotational axis.

14. The door lock apparatus of claim 13, wherein the first side wall, the second side wall, the third side wall, and the fourth side wall each comprise a flat side wall.

15. The door lock apparatus of claim 8, further comprising a plurality of ribs positioned adjacent the spring cage and operable to transfer forces exerted on the spring cage to the escutcheon.

16. The door lock apparatus of claim 15, further comprising a support wall connected with the plurality of ribs and positioned adjacent a wall portion of the spring cage.

17. The door lock apparatus of claim 16, wherein the support wall is an arcuate support wall, and wherein the wall portion of the spring cage comprises an arcuate wall portion.

18. A door lock apparatus, comprising:

an escutcheon configured for mounting to a door, the escutcheon including a first side wall spaced from a second side wall;

a spring cage including a first flat side and a second flat side; and a spindle rotatably mounted to the spring cage for rotation relative to the spring cage about a rotational axis; and wherein the first and second flat sides of the spring cage are engaged against the first and second side walls of the escutcheon to inhibit rotation of the spring cage relative to the escutcheon about the rotational axis.

19. The door lock apparatus of claim 18, wherein the first and second side walls of the escutcheon comprise flat side walls.

20. The door lock apparatus of claim 18, further comprising a plurality of ribs positioned adjacent the spring cage and operable to transfer forces exerted on the spring cage to the escutcheon.

21. The door lock apparatus of claim 1, wherein the first flat side wall of the non-circular spring cage abuts the first side wall of the escutcheon to prevent rotation of the non-circular spring cage relative to the escutcheon.

22. The door lock apparatus of claim 2, wherein the first and second flat side walls of the non-circular spring cage abut the first and second side walls of the escutcheon, respectively, to prevent rotation of the non-circular spring cage relative to the escutcheon.

* * * * *